United States Patent
Konno et al.

(10) Patent No.: US 11,435,216 B2
(45) Date of Patent: Sep. 6, 2022

(54) ULTRASONIC DISTANCE MEASURING DEVICE

(71) Applicant: DENSO CORPORATION, Kariya (JP)

(72) Inventors: Akihiro Konno, Kariya (JP); Hironori Iwamiya, Kariya (JP); Takuya Koizumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 16/920,886

(22) Filed: Jul. 6, 2020

(65) Prior Publication Data
US 2021/0010847 A1 Jan. 14, 2021

(30) Foreign Application Priority Data

Jul. 10, 2019 (JP) .............................. JP2019-128735

(51) Int. Cl.
| | |
|---|---|
| *G01F 23/2962* | (2022.01) |
| *B60K 15/03* | (2006.01) |
| *B60R 16/023* | (2006.01) |

(52) U.S. Cl.
CPC .......... *G01F 23/2962* (2013.01); *B60K 15/03* (2013.01); *B60R 16/0231* (2013.01); *B60K 2015/03217* (2013.01)

(58) Field of Classification Search
CPC .................................................. G01F 23/2962
See application file for complete search history.

(56) References Cited

U.S. PATENT DOCUMENTS 4,315,325 A * 2/1982 Blades .................... G01S 7/527
367/98
4,785,664 A * 11/1988 Reebs ................. G01F 23/2962
340/621

(Continued)

FOREIGN PATENT DOCUMENTS

| JP | 2006-145403 A | 6/2006 |
|---|---|---|
| JP | 2018-115881 A | 7/2018 |

(Continued)

OTHER PUBLICATIONS

U.S. Appl. No. 16/921,141, filed Jul. 6, 2020, Kurokawa et al.
U.S. Appl. No. 16/785,815, filed Feb. 10, 2020, Koizumi et al.

*Primary Examiner* — Nimeshkumar D Patel
*Assistant Examiner* — Jean F Morello
(74) *Attorney, Agent, or Firm* — Posz Law Group, PLC

(57) ABSTRACT

An ultrasonic element generates an ultrasonic wave and converts an input ultrasonic wave into an electric signal. A transmission circuit outputs a drive signal to the ultrasonic element. A comparator circuit outputs a first detection signal when the electric signal becomes larger than a threshold value and outputs a second detection signal when the electric signal becomes smaller than the threshold value. An arithmetic circuit computes a distance of a propagation path of the ultrasonic wave based on a time difference between an output timing, at which the ultrasonic element outputs of the ultrasonic wave, and a liquid level timing, at which the comparator circuit outputs the first detection signal, and based on a propagation speed of the ultrasonic wave. A storage unit stores a time difference between the first detection signal and the second detection signal. The transmission circuit increases the drive signal, as the time difference decreases.

7 Claims, 9 Drawing Sheets

(56) References Cited

U.S. PATENT DOCUMENTS

| | | | | |
|---|---|---|---|---|
| 8,483,012 B2* | 7/2013 | Hu | ............................ | G01S 15/04 |
| | | | | 367/98 |
| 2005/0284217 A1* | 12/2005 | Miyagawa | ............ | G01F 23/2962 |
| | | | | 73/290 V |
| 2010/0101320 A1* | 4/2010 | Sears | ........................ | G01S 15/88 |
| | | | | 73/290 V |

FOREIGN PATENT DOCUMENTS

| | | |
|---|---|---|
| JP | 2018-119808 A | 8/2018 |
| JP | 2018-194407 A | 12/2018 |
| JP | 2018-194408 A | 12/2018 |

\* cited by examiner

ULTRASONIC DISTANCE MEASURING DEVICE

CROSS REFERENCE TO RELATED APPLICATION

The present application claims the benefit of priority from Japanese Patent Application No. 2019-128735 filed on Jul. 10, 2019. The entire disclosures of all of the above applications are incorporated herein by reference.

TECHNICAL FIELD

The present disclosure relates to an ultrasonic distance measuring device that measures a length of an ultrasonic wave propagation path for an ultrasonic wave.

BACKGROUND

A known liquid level detection device generates an ultrasonic wave toward a liquid fuel and detects a position of a liquid level by detecting the ultrasonic wave reflected on the liquid level.

SUMMARY

According to an aspect of the present disclosure, an ultrasonic distance measuring device is measures a length of an ultrasonic wave propagation path between a liquid level of a detected fluid reserved in a tank and an ultrasonic element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
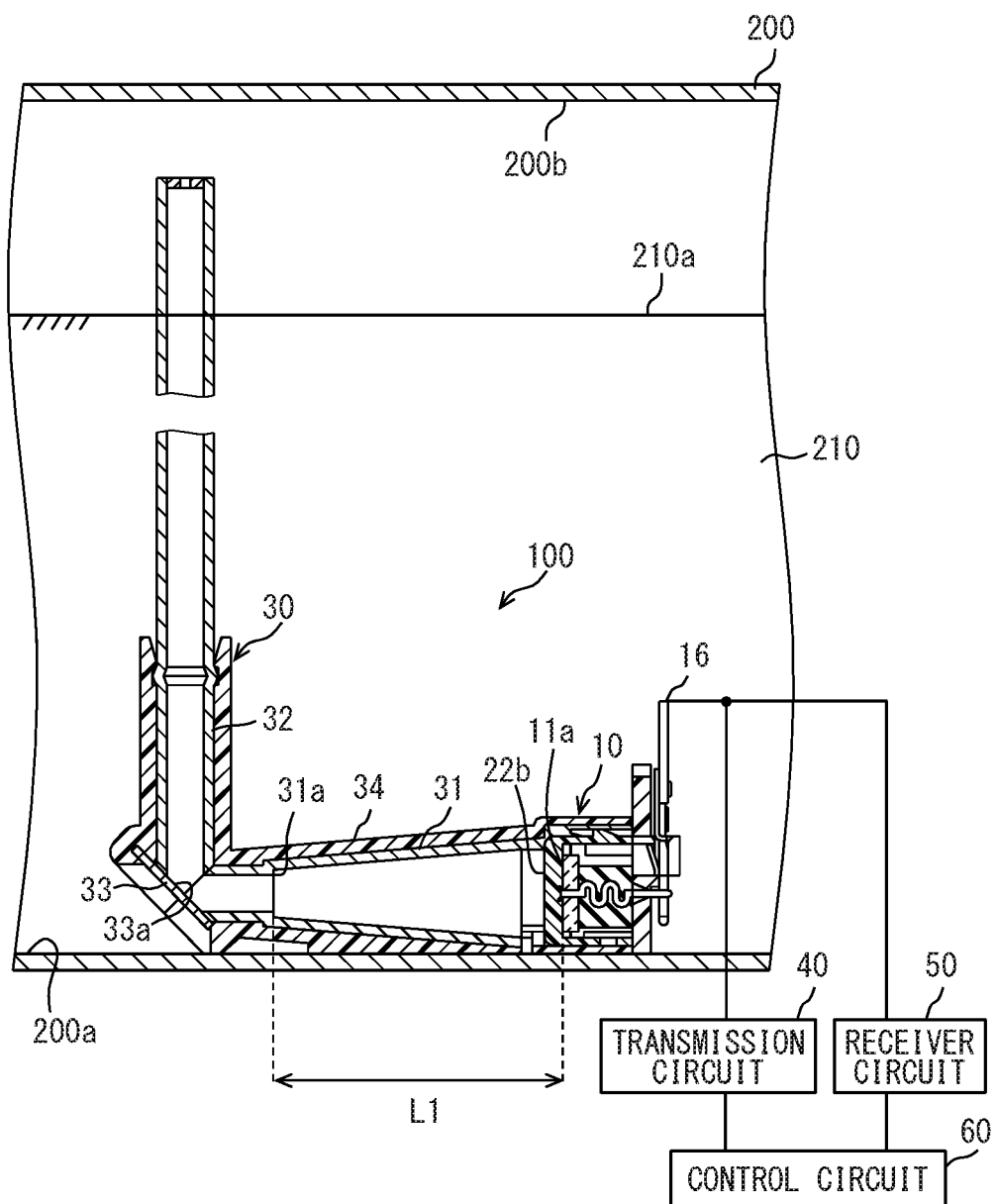
FIG. 1 is an explanatory diagram illustrating an overall configuration of a ultrasonic distance measuring device.
Figure 2:
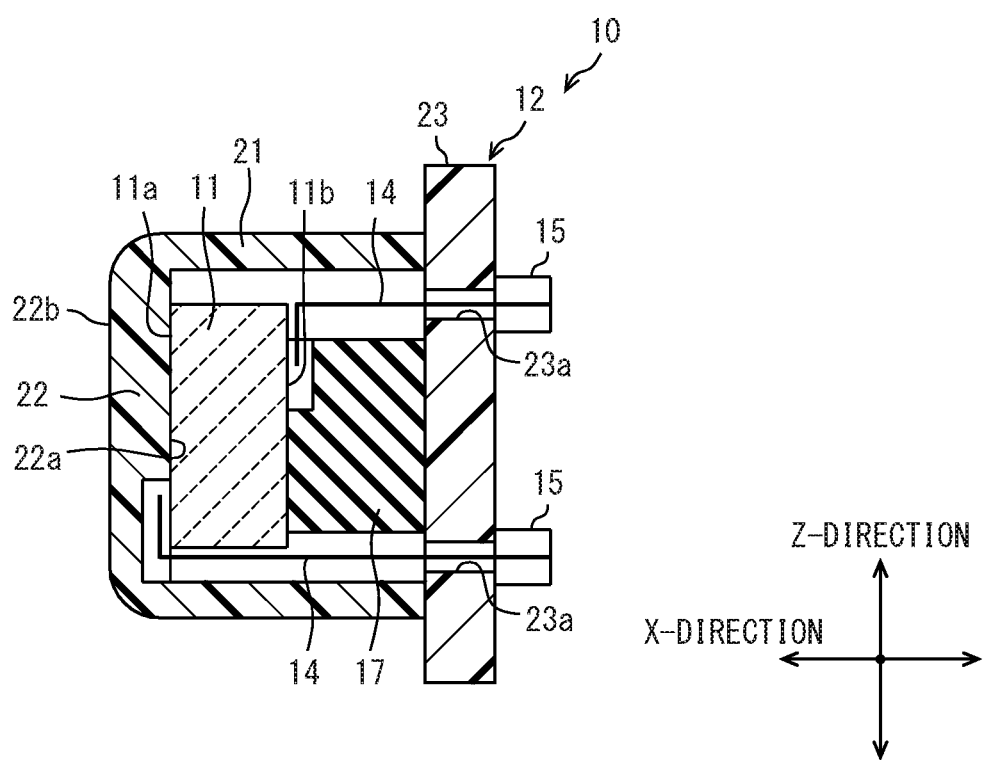
FIG. 2 is a sectional view illustrating a schematic configuration of an ultrasonic sensor.

As follow, examples of the present disclosure will be described.

According to an example of the present disclosure, a liquid level detection device generates an ultrasonic wave toward a liquid fuel and detects a position of a liquid level by detecting the ultrasonic wave reflected on the liquid level.

It is noted that, the higher the position of the liquid surface of the fuel, the longer the length of the propagation path of ultrasonic waves (propagation path). The longer the length of the propagation path, the lower the intensity of the ultrasonic wave propagating along the propagation path and returning to the ultrasonic element. As a result, the accuracy of detecting the length of the propagation path may decrease.

On the other hand, it is assumable to increase an output intensity of the ultrasonic wave thereby to increase an intensity of the ultrasonic wave propagating through the propagation path and returning to the ultrasonic element. However, in this case, the voltage applied to the ultrasonic element increases. Therefore, electrolytic corrosion is likely to occur in the ultrasonic element. Consequently, electrical connection failure is likely to occur between the ultrasonic element and the lead connected to the ultrasonic element. Thus, reliability of the electrical connection may be reduced.

According to an example of the present disclosure, an ultrasonic distance measuring device is to measure a length of an ultrasonic wave propagation path between a liquid level of a detected fluid reserved in a tank and an ultrasonic element. The ultrasonic distance measuring device comprises the ultrasonic element configured to generate an ultrasonic wave and to convert an input ultrasonic wave into an electric signal. The ultrasonic distance measuring device further comprises a transmission circuit configured to output a drive signal that causes the ultrasonic element to generate an ultrasonic wave. The ultrasonic distance measuring device further comprises a connection portion that connects the ultrasonic element to the transmission circuit. The ultrasonic distance measuring device further comprises a comparator circuit configured to output a first detection signal when the electric signal converted by the ultrasonic element becomes larger than a threshold value and output a second detection signal when the electric signal converted by the ultrasonic element becomes smaller than the threshold value. The ultrasonic distance measuring device further comprises an arithmetic circuit configured to compute a length of the propagation path based on a time difference between an output timing, at which the ultrasonic element outputs an ultrasonic wave, and a liquid level timing, at which the comparator circuit outputs the first detection signal based on an ultrasonic wave reflecting off the liquid level, and based on a propagation speed of the ultrasonic wave. The ultrasonic distance measuring device further comprises a storage unit configured to store a time difference between the first detection signal and the second detection signal of an ultrasonic wave reflecting off the liquid surface. The transmission circuit is configured to increase the drive signal, as the time difference decreases. The time difference is between the first detection signal and the second detection signal of an ultrasonic wave reflecting off the liquid level and stored in the storage unit.

It is expected that the smaller the time difference between the first detection signal and the second detection signal of the ultrasonic wave (liquid surface wave) reflecting off the liquid surface, the smaller the intensity of the liquid surface wave. On the other hand, in the present disclosure, the drive signal increases as the time difference between the first detection signal and the second detection signal of the liquid surface wave becomes shorter. As a result, a decrease in the accuracy of detecting the length of the propagation path is suppressed.

In other words, according to an example of the present disclosure, the drive signal decreases as the time difference between the first detection signal and the second detection signal of the liquid surface wave increases. This suppresses occurrence of electrolytic corrosion in the ultrasonic element. Further, it is possible to restrict electrical connection failure between the ultrasonic element and the connecting portions. Therefore, it is possible to suppress deterioration in electrical connection reliability between the ultrasonic element and the connecting portions.

First Embodiment

Hereinafter, the ultrasonic distance measuring device 100 will be described with reference to FIGS. 1 to 9. In the description below, three directions x, y, and z are orthogonal to each other. The x-direction corresponds to a horizontal direction. The z-direction corresponds to a height direction.

As illustrated in FIG. 1, the ultrasonic distance measuring device 100 is provided in a fuel tank 200 for vehicles. The ultrasonic distance measuring device 100 detects a liquid level 210a of fuel 210 reserved in the fuel tank 200. The fuel 210 represents gasoline, for example. The fuel 210 is assumed to be a detected fluid.

Figure 3:
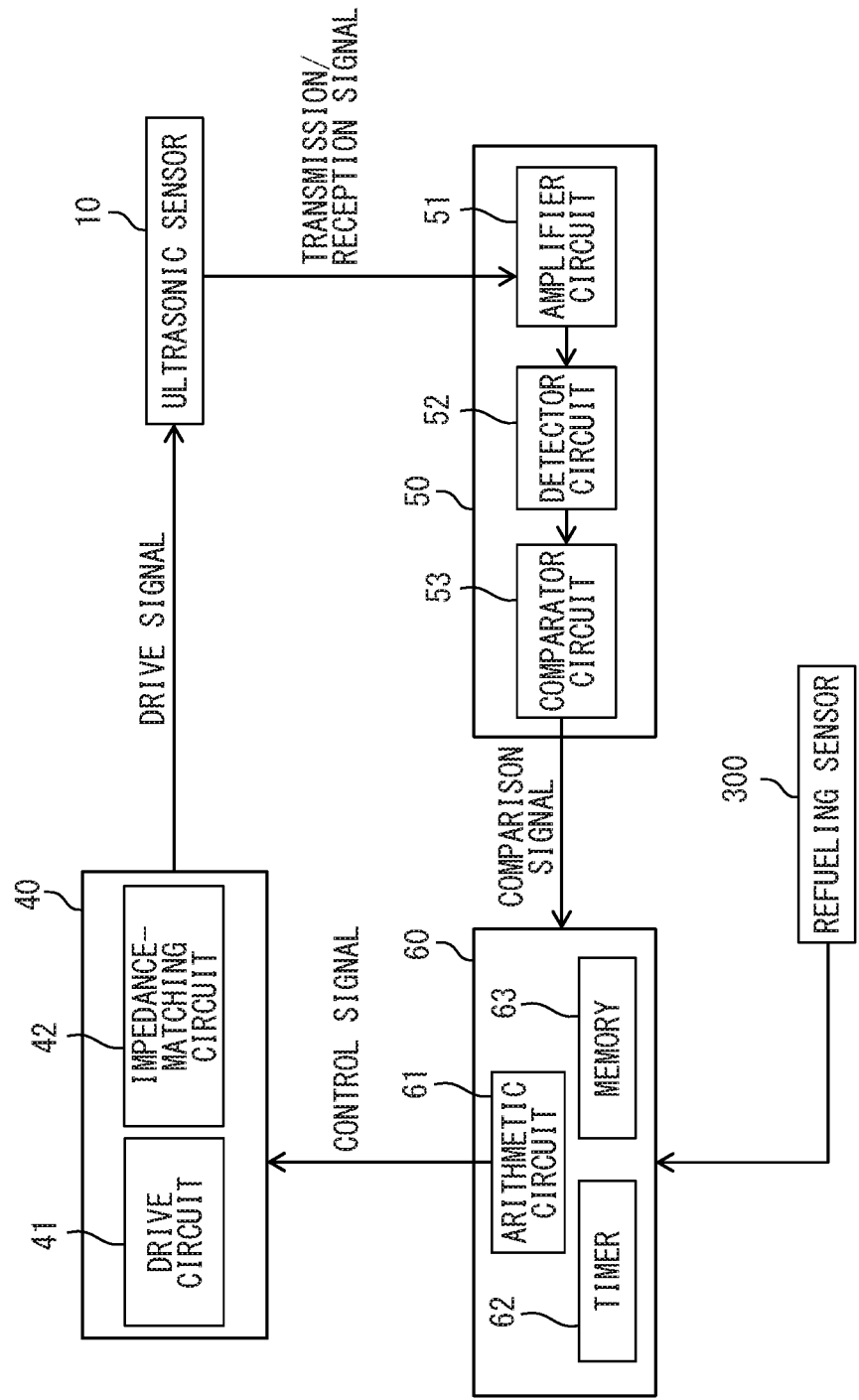
FIG. 3 is a block diagram illustrating signals transmitted through the ultrasonic distance measuring device.

As illustrated in FIGS. 1 and 3, the ultrasonic distance measuring device 100 includes an ultrasonic sensor 10, a transmission pipe 30, a transmission circuit 40, a receiver circuit 50, and a control circuit 60. The ultrasonic sensor 10 is provided at the transmission pipe 30. The ultrasonic sensor 10 is electrically connected to the transmission circuit 40 and the receiver circuit 50. The transmission circuit 40 and the receiver circuit 50 are electrically connected to the control circuit 60.

The ultrasonic sensor 10 and the transmission pipe 30 are provided at a bottom face 200a of the fuel tank 200. The ultrasonic sensor 10 and the transmission pipe 30 are placed in the fuel 210. An ultrasonic wave generated from the ultrasonic sensor 10 propagates through the fuel 210 in the fuel tank 200.

The ultrasonic sensor 10 and the transmission pipe 30 may be provided at a top face 200b distanced from the bottom face 200a in the z-direction. The z-direction corresponds to the vertical direction when a vehicle stops on a flat surface. The top face 200b is positioned above the liquid level 210a of the fuel 210 in the vertical direction. The ultrasonic sensor 10 and the transmission pipe 30 are positioned outside the fuel 210. An ultrasonic wave generated from the ultrasonic sensor 10 propagates through the air in the fuel tank 200.

Ultrasonic Sensor

The ultrasonic sensor 10 includes an ultrasonic element 11 and a case 12. The ultrasonic element 11 represents an ultrasonic transducer to generate ultrasonic waves. The ultrasonic element 11 is made of a piezoelectric material such as lead zirconium titanate (PZT) that causes the piezoelectric effect. The piezoelectric material changes in the volume in response to an applied voltage and generates a voltage in response to an applied external force.

The ultrasonic element 11 is shaped into a disk whose thickness direction corresponds to the x-direction. The ultrasonic element 11 includes a contact face 11a and a reverse face 11b positioned in the x-direction. An electrode is printed on the contact face 11a and the reverse face 11b. The electrode is formed in the entirety of the contact face 11a and the reverse face 11b.

One end of a lead 14 is soldered or crimped to the electrode formed on the contact face 11a and the reverse face 11b. The other end of the lead 14 is connected to a terminal 15 illustrated in FIG. 2. The terminal 15 is connected to a lead wire 16 illustrated in FIG. 1. The lead wire 16 is electrically connected with the transmission circuit 40 and the receiver circuit 50. The lead 14, the terminal 15, and the lead wire 16 are comparable to a connecting portion.

The case 12 provides storage space to contain the ultrasonic element 11. The case 12 is made of an insulating resin material. Specifically, the case 12 includes a cylindrical portion 21, a bottom portion 22, and a cover portion 23. The bottom portion 22 is integrally formed with the cylindrical portion 21. The cover portion 23 is formed independently of the cylindrical portion 21 and the bottom portion 22.

The cylindrical portion 21 extends in an axial direction corresponding to the x-direction orthogonal to the z-direction. The bottom portion 22 closes one of two openings of the cylindrical portion 21. The other opening of the cylindrical portion 21 is left open. The cover portion 23 is connected with the cylindrical portion 21 in a manner of closing the opening of the cylindrical portion 21. Therefore, a cavity in the cylindrical portion 21 forms a closed space. The cavity of the cylindrical portion 21 serves as the storage space of the case 12. The cover portion 23 includes a hole 23a to partially expose the lead 14 from the storage space.

The storage space includes a vibration-proof portion 17 in addition to the ultrasonic element 11. The vibration-proof portion 17 is made of an elastic resin material or a rubber material. The material includes nitrile rubber, for example.

In the storage space, the ultrasonic element 11 is positioned toward the bottom portion 22. The vibration-proof portion 17 is positioned toward the cover portion 23. When the cover portion 23 is fastened to the cylindrical portion 21, the vibration-proof portion 17 is pressed between the ultrasonic element 11 and the cover portion 23. The vibration-proof portion 17 is elastically deformed in the x-direction. The vibration-proof portion 17 generates a restoring force in the x-direction. The restoring force places the contact face 11a of the ultrasonic element 11 in contact with an inner face 22a of the bottom portion 22. The vibration-proof portion 17 comes in contact with the cover portion 23.

The transmission circuit 40 supplies a drive signal that causes the ultrasonic element 11 to generate an ultrasonic wave. The ultrasonic element 11 then vibrates in the x-direction in which the contact face 11a and the reverse face 11b are placed. The vibration also vibrates the bottom portion 22 of the case 12 in the x-direction while the bottom portion 22 is placed in contact with the ultrasonic element 11. The vibration is applied to the fuel 210 in contact with an outer face 22b of the bottom portion 22. The fuel 210 generates an ultrasonic wave.

Suppose an externally applied vibration vibrates the bottom portion 22. Then, the ultrasonic element 11 is pressed between the bottom portion 22 and the vibration-proof portion 17 in the x-direction. The ultrasonic element 11 generates a voltage. The voltage corresponding to the applied vibration is used as a signal to receive the ultrasonic wave and is input to the receiver circuit 50.

A reverberating vibration remains in the ultrasonic element 11 after generating the ultrasonic wave. The vibration-proof portion 17 prevents the reverberating vibration from occurring. The vibration-proof portion 17 also prevents the ultrasonic wave generated from the ultrasonic element 11 from leaking outside the storage space of the case 12 via the cover portion 23.

Transmission Pipe

The transmission pipe 30 causes an ultrasonic wave output from the ultrasonic sensor 10 to propagate to the liquid level 210a of the fuel 210. The transmission pipe 30 provides a path (propagation path) that causes the ultrasonic wave reflecting off the liquid level 210a to propagate to the ultrasonic element 11 again.

The transmission pipe 30 includes a horizontal pipe 31, a vertical pipe 32, and a reflective plate 33 as members to configure the propagation path. The transmission pipe 30 also includes a housing 34 that connects the members of the propagation path with the case 12 of the ultrasonic sensor 10.

The horizontal pipe 31 and the vertical pipe 32 are made of a metal material such as aluminum die-casting alloy. The horizontal pipe 31 communicates with the vertical pipe 32 through respective cavities. The case 12 is provided at one of two openings of the horizontal pipe 31. The vertical pipe 32 is connected with the other opening of the horizontal pipe 31. The horizontal pipe 31 and the vertical pipe 32 may be made of an insulating resin material. The other opening of the horizontal pipe 31 corresponds to the distal end of a reference pipe.

The horizontal pipe 31 is provided at the bottom face 200*a* of the fuel tank 200. The horizontal pipe 31 includes a communicating hole (unshown) opened toward the bottom face 200*a*. The fuel 210 enters the cavity of the horizontal pipe 31 through the communicating hole. The fuel 210 enters the cavity of the vertical pipe 32 communicating with the cavity of the horizontal pipe 31.

As illustrated in FIG. 1, the horizontal pipe 31 extends in the x-direction. The inner diameter of the horizontal pipe 31 is tapered from one of the two openings to the other. The bottom portion 22 of the case 12 is provided at one of the two openings of the horizontal pipe 31. The outer face 22*b* of the bottom portion 22 closes the same end.

The vicinity of the other of the two openings of the horizontal pipe 31 includes a part to steeply taper the inner diameter. A reference plane 31*a* is formed circularly around the axial direction (x-direction) of the horizontal pipe 31 near the other one of the two openings of the horizontal pipe 31.

The reference plane 31*a* is opposite to the outer face 22*b* of the case 12 in the x-direction while the outer face 22*b* closes one of the two openings of the horizontal pipe 31. Reference distance L1 as a predetermined length specifies a distance between the reference plane 31*a* and the contact face 11*a* of the ultrasonic element 11 in the x-direction.

When the ultrasonic element 11 generates an ultrasonic wave in the above-described configuration, the ultrasonic wave propagates from one end of the horizontal pipe 31 to the other end. The ultrasonic wave partially reflects off the reference plane 31*a*. The reflected ultrasonic wave (reference wave) enters the outer face 22*b* of the ultrasonic sensor 10. Then, the ultrasonic element 11 vibrates. The ultrasonic element 11 generates a reception signal based on the reference wave.

As above, reference distance L1 is defined as the predetermined length. Therefore, it is possible to find propagation velocity v of an ultrasonic wave propagating through the fuel 210 based on reference distance L1 and reference time t01 elapsed after the ultrasonic wave is output until the reference wave returns to the ultrasonic element 11. This is formulated as $v=2L1/t01$. The horizontal pipe 31 includes the part between the reference plane 31*a* and one end of the two openings of the horizontal pipe 31. This part is comparable to the reference pipe.

The vertical pipe 32 extends in the z-direction. One end of the vertical pipe 32 connects with the other end of the horizontal pipe 31. The other end of the vertical pipe 32 is positioned toward the top face 200*b*. The inner diameter of the vertical pipe 32 is equal to the inner diameter of the other end of the horizontal pipe 31. The vertical pipe 32 is comparable to a detection pipe.

The length of the vertical pipe 32 in the z-direction is configured so that the other end protrudes from the liquid level 210*a* toward the top face 200*b* when the fuel 210 is filled up in the fuel tank 200. The fuel 210 inside the cavity of the vertical pipe 32 and the fuel 210 outside the same maintain the same liquid level 210*a*.

The reflective plate 33 is made of a metal material such as a ferrous metal or stainless steel plate. The reflective plate 33 is provided between the horizontal pipe 31 and the vertical pipe 32. The reflective plate 33 includes a reflective surface 33*a* connecting with inside wall surfaces that compart the cavities of the horizontal pipe 31 and the vertical pipe 32. The reflective surface 33*a* and the inside wall surfaces of the horizontal pipe 31 and the vertical pipe 32 compart the propagation path of the transmission pipe 30.

The reflective plate 33 is formed into a sheet. The reflective plate 33 tilts approximately 45 degrees against the bottom face 200*a* of the fuel tank 200. The reflective surface 33*a* of the reflective plate 33 is positioned opposite to the outer face 22*b* of the ultrasonic sensor 10 in the x-direction through the intermediation of the fuel 210 filled in the cavity of the horizontal pipe 31. The reflective surface 33*a* is positioned opposite to the liquid level 210*a* in the z-direction through the intermediation of the fuel 210 filled in the cavity of the vertical pipe 32.

When the ultrasonic sensor 10 generates an ultrasonic wave, the ultrasonic wave propagates toward the reflective plate 33 positioned between the horizontal pipe 31 and the vertical pipe 32. The ultrasonic wave partially enters the reflective surface 33*a* of the reflective plate 33 and reflects off toward the liquid level 210*a*. The ultrasonic wave partially enters the liquid level 210*a* and reflects. The ultrasonic wave (liquid level wave) reflecting off the liquid level 210*a* partially propagates toward the reflective plate 33 and enters the reflective surface 33*a*. The liquid level wave entering the reflective surface 33*a* partially reflects and propagates toward the ultrasonic sensor 10. The ultrasonic wave then enters the outer face 22*b* of the ultrasonic sensor 10. The ultrasonic element 11 generates a reception signal based on the liquid level wave.

As above, propagation velocity v of the ultrasonic wave can be found based on the reference wave. Therefore, it is possible to find propagation path length L2 based on propagation velocity v and propagation path time t02 elapsed after the ultrasonic wave is output until the liquid level wave returns to the ultrasonic element 11. This is formulated as $L2=v\times t02/2$.

The housing 34 is made of a resin material excellent in the stability concerning the fuel 210. The housing 34 covers surfaces of the horizontal pipe 31, part of the vertical pipe 32 toward the horizontal pipe 31, and the cylindrical portion 21. The housing 34 fastens the ultrasonic sensor 10 to the horizontal pipe 31.

Transmission Circuit

The transmission circuit 40 includes a drive circuit 41 and an impedance-matching circuit 42. The drive circuit 41 includes a switch provided between a power supply and the ground. The impedance-matching circuit 42 includes a diode provided between the power supply and the switch. A cathode electrode of the diode is connected to the power supply. The impedance-matching circuit 42 includes a primary pulse transformer and a secondary pulse transformer. The primary pulse transformer is connected to the diode in parallel. The secondary pulse transformer is magnetically coupled with the primary pulse transformer. The lead wire 16 is connected to both ends of the secondary pulse transformer.

A control signal supplied from the control circuit 60 controls a switch element to open and close. When the switch element changes from the open state to the closed state, an electric current as a drive signal is applied to the pulse transformer. A voltage is then applied to the ultrasonic element 11 via the lead wire 16.

This switch element is, for example, an N-channel MOS-FET. A control signal is input to a gate electrode of this switch element. The control signal includes at least one pulse signal. The cycle of the voltage output from the transmission circuit 40 to the ultrasonic element 11 is a resonance frequency of the ultrasonic element 11 due to the input of the pulse signal to the switch element.

When the number of pulse signals included in the control signal is large, the intensity of the ultrasonic wave output from the ultrasonic element 11 increases. To the contrary, when the number of pulse signals included in the control signal is small, the intensity of the ultrasonic wave output from the ultrasonic element 11 decreases.

In the following, the number of pulse signals included in the control signal and relevant to the intensity of this ultrasonic wave is referred to as an intensity set value. The memory 63, which will be described later, stores in advance a correlation between the intensity set value and the intensity of the detection signal based on the liquid surface wave (liquid surface wave intensity). The liquid surface wave intensity is determined by the length of the time difference between the rising edge and the falling edge with respect to the threshold value of the detection signal based on the liquid surface wave which will be described later. The longer the time difference is, the higher the liquid surface wave intensity is.

The correlation stored in the memory 63 is such that the intensity set value increases as the liquid surface wave intensity decreases. The higher the liquid surface wave intensity, the smaller the intensity set value.

In other words, the correlation stored in the memory 63 is such that the number of pulse signals included in the intensity set value increases as the liquid surface wave intensity decreases. As the liquid surface wave intensity increases, the number of pulse signals included in the intensity set value decreases.

Receiver Circuit

The receiver circuit 50 includes an amplifier circuit 51, a detector circuit 52, and a comparator circuit 53. The amplifier circuit 51 connects with the two lead wires 16 connected to both ends of the above-described secondary pulse transformer. Therefore, the amplifier circuit 51 is supplied with a drive signal (transmission signal) supplied to the ultrasonic element 11 from the transmission circuit 40 and a reception signal supplied from the ultrasonic element 11.

The amplifier circuit 51 amplifies the transmission signal and the reception signal. The amplifier circuit 51 outputs the amplified transmission and reception signals (amplified signals) to the detector circuit 52.

The detector circuit 52 applies half-wave rectification to the amplified signals and generates a detection signal by concatenating peaks of the half-wave rectified signals. The detector circuit 52 outputs the detection signal to the comparator circuit 53.

The comparator circuit 53 compares the detection signal with a threshold value. The comparator circuit 53 generates a comparison signal that goes high corresponding to a detection signal larger than the threshold value and goes low corresponding to a detection signal smaller than the threshold value. The comparator circuit 53 outputs the comparator circuit 53 to the control circuit 60. The comparator circuit 53 may generate a comparison signal that goes low corresponding to a detection signal larger than the threshold value and goes high corresponding to a detection signal smaller than the threshold value. The comparison signal includes a first detection signal and to second detection signal.

Control Circuit

The control circuit 60 includes an arithmetic circuit 61, a timer 62, and memory 63. The arithmetic circuit 61 periodically performs an elapsed-time detection process, a propagation velocity detection process, and a propagation path detection process (to be described) at an interval of 100 ms, for example. When an ignition switch of the vehicle changes from off to on, the arithmetic circuit 61 performs the elapsed-time detection process, the propagation velocity detection process, and the propagation path detection process as event processes. The memory 63 is comparable to a storage unit.

Figure 4:
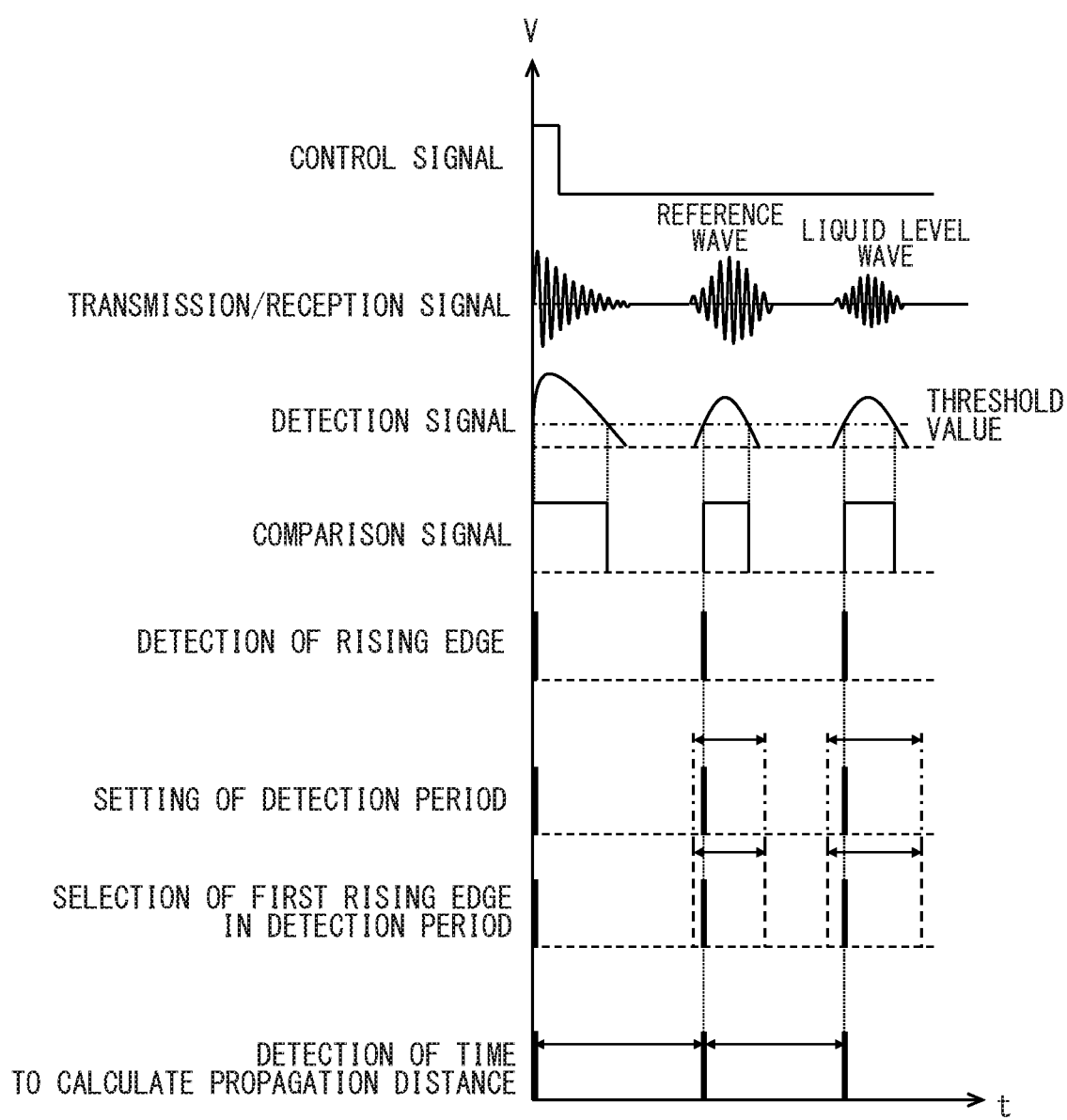
FIG. 4 is a timing chart illustrating a signal process.

The arithmetic circuit 61 outputs a control signal illustrated in FIG. 4 to the transmission circuit 40. When receiving the control signal, the transmission circuit 40 outputs a drive signal to the ultrasonic element 11. Supplied with the drive signal, the ultrasonic sensor 10 outputs an ultrasonic wave to the fuel 210 in the transmission pipe 30. The ultrasonic wave partially reflects off the reference plane 31a and returns as the reference wave to the ultrasonic sensor 10. The ultrasonic wave propagating through the fuel 210 in the transmission pipe 30 partially reflects off the liquid level 210a and returns as the liquid level wave to the ultrasonic sensor 10.

When receiving the ultrasonic wave, the ultrasonic sensor 10 converts the ultrasonic wave into a voltage to generate an electric signal (reception signal). The ultrasonic sensor 10 outputs the reception signal to the receiver circuit 50.

When supplied with the reception signal, the receiver circuit 50 amplifies the reception signal and converts it into a detection signal. The receiver circuit 50 compares the detection signal with a threshold value to generate a comparison signal. The receiver circuit 50 outputs the comparison signal to the arithmetic circuit 61.

As above, the drive signal is input to the receiver circuit 50 in addition to the ultrasonic sensor 10. Therefore, the receiver circuit 50 converts the drive signal into a detection signal to generate a comparison signal before converting the reception signal into a detection signal to generate a comparison signal. The receiver circuit 50 also outputs the comparison signal based on the drive signal to the arithmetic circuit 61.

The arithmetic circuit 61 detects timings (rising edges) at which voltage levels of the input comparison signals rise from low to high. The arithmetic circuit 61 identifies the first detected rising edge as the timing to output the ultrasonic wave from the ultrasonic sensor 10 in response to the input of the drive signal to the ultrasonic sensor 10.

The arithmetic circuit 61 computes a time difference between the rising edge and a rising edge to be detected later based on the time measured by the timer 62. The arithmetic circuit 61 computes the time elapsed until the ultrasonic wave output from the ultrasonic sensor 10 returns to the ultrasonic sensor 10. The arithmetic circuit 61 stores the elapsed time in the memory 63.

The arithmetic circuit 61 detects timings (falling edges) at which voltage levels of the input comparison signals fall from high to low. The arithmetic circuit 61 detects the elapsed time between the rising edge second detected and the falling edge detected thereafter as the liquid surface wave intensity.

Signal Intensity

Figure 5:
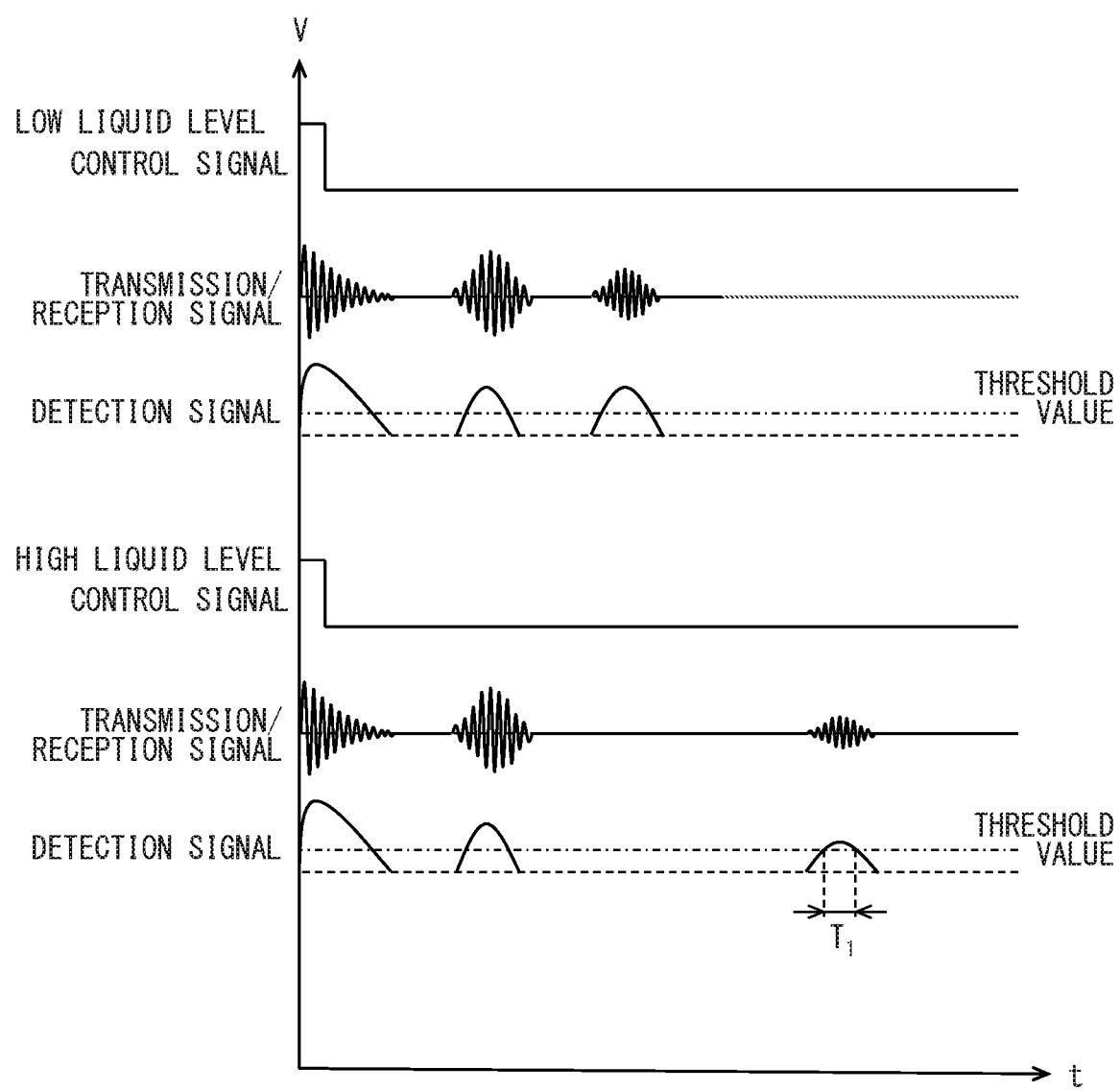
FIG. 5 is a timing chart illustrating a detection signal when the liquid level is different.
Figure 6:
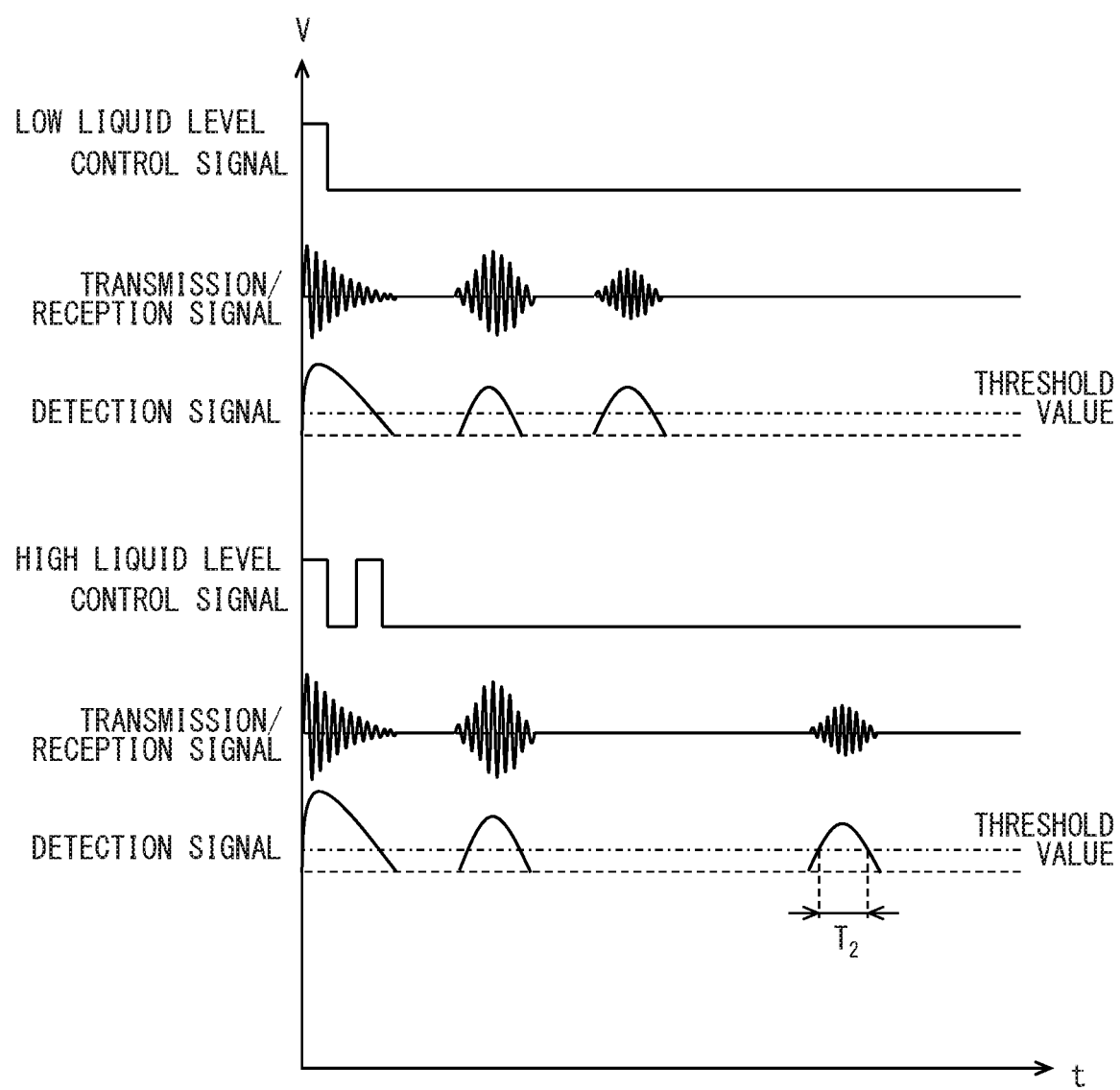
FIG. 6 is a timing chart illustrating a control signal when the liquid level is different.

As illustrated in FIGS. 4 to 6, for example, the ultrasonic sensor 10 outputs an ultrasonic wave and then is expected to receive two ultrasonic waves, namely, the reference wave reflecting off the reference plane 31a and the liquid level wave reflecting off the liquid level 210a. Therefore, the arithmetic circuit 61 is expected to detect two rising edges except a rising edge based on the drive signal. Of the two rising edges, the rising edge based on the reference wave is expected to be detected in a short time. The rising edge based on the liquid level wave is expected to be detected in a long time.

When the propagation velocity v is constant, the reference timing at which the rising edge is detected based on the reference wave is constant regardless of the position of the liquid surface 210a. The liquid surface timing at which the rising edge is detected based on the liquid surface wave is unfixed because the liquid surface timing depends on the position of the liquid surface 210a even in the case where the propagation speed v is constant.

The ultrasonic wave propagates through the fuel 210 in the propagation path, and the intensity of the ultrasonic wave gradually decreases during the propagation. The intensity of the ultrasonic wave decreases as the propagation path length L2 increases. For example, as shown in FIG. 5, when the position of the liquid surface 210a is low in a low liquid level state, it is expected that the intensity of the detection signal based on the liquid surface wave tends to be sufficiently higher than the threshold value. When the liquid level 210a is high and the liquid level is high, it is expected that the intensity of the detection signal based on the liquid level wave will not be sufficiently higher than the threshold value. It is expected that the time T1 when the detected signal is higher than the threshold value becomes short.

Therefore, when detecting the propagation path length for the first time, the arithmetic circuit 61 reads the initial value stored in advance in the memory 63. This initial value is the intensity set value of the control signal that is expected to be sufficiently higher than the threshold value in the intensity of the detection signal based on the liquid surface wave obtained when the fuel 210 is fully stored in the fuel tank 200. This initial value is also incorporated in the correlation between the liquid surface wave intensity and the intensity set value.

The arithmetic circuit 61 outputs a control signal according to the initial value stored in the memory 63 to the transmission circuit 40. As a result, for example, as shown in FIG. 6, the number of pulses included in the control signal increases as compared with the case in the low liquid level state. The intensity of the detection signal based on the liquid surface wave increases. The time T2 in which the detection signal is higher than the threshold value is longer than the time T1 shown in FIG. 5.

Subsequently, the arithmetic circuit 61 computes the propagation path length L2 by using the rising edge of the comparison signal output from the comparator circuit 53 when the detection signal becomes larger than the threshold value. The arithmetic circuit 61 stores the computed propagation path length L2 in the memory 63.

The arithmetic circuit 61 also computes the time difference between the rising edge and the falling edge of the comparison signal output from the comparator circuit 53 as the liquid surface wave intensity. The arithmetic circuit 61 stores the computed liquid surface wave intensity in the memory 63. The liquid surface wave intensity is computed based on the ultrasonic wave reflecting off the liquid surface 210a, and the computation thereof will be described in detail later.

When outputting the control signal again, the memory 63 stores the liquid surface wave intensity computed in the previous process for computing the propagation path length. Further, the memory 63 stores in advance the correlation between the liquid surface wave intensity and the intensity set value.

The arithmetic circuit 61 reads the intensity set value corresponding to the liquid surface wave intensity stored in the memory 63 from the correlation. Then, the arithmetic circuit 61 outputs a control signal according to the read intensity set value to the transmission circuit 40. This suppresses decrease in the intensity of the detection signal.

Number of Rising Edges

As described above, the arithmetic circuit 61 is expected to detect two rising edges except a rising edge based on the drive signal. It is expected that these two rising edges are based on the reference wave and the liquid surface wave.

However, if noise overlaps the detected signal, more than two rising edges may be detected. Consequently, it is impossible to determine which rising edges are based on the reference wave and the liquid level wave.

To solve this issue, the arithmetic circuit 61 is assigned with a reference detection period to detect a rising edge based on the reference wave. The arithmetic circuit 61 is assigned with a propagation path detection period to detect a rising edge based on the liquid level wave.

Reference Detection Period

Reference time t01 elapses after the ultrasonic sensor 10 outputs an ultrasonic wave until the reference wave reflecting off the reference plane 31a returns to the ultrasonic sensor 10. Reference time t01 depends on reference distance L1 and propagation velocity v of the ultrasonic wave. Reference distance L1 is constant. Therefore, reference time t01 varies with propagation velocity v.

Reference time t01 is longest when propagation velocity v is lowest. Reference time t01 is shortest when propagation velocity v is highest. It is expected that a rising edge based on the reference wave is detected at the timing between the shortest reference time t01 and the longest reference time t01. However, a rising edge may be detected during a period except the time between the shortest reference time t01 and the longest reference time t01. Then, it is supposed that the rising edge is not based on the reference wave.

Temperature-dependent properties of propagation velocity v of the ultrasonic wave depend on compositions of the fuel 210 where the ultrasonic wave propagates. The fuel 210 according to the present embodiment increases propagation velocity v as the temperature lowers. Therefore, the highest propagation velocity v described above corresponds to the lowest operating ambient temperature for the ultrasonic distance measuring device 100 (ultrasonic element 11). The lowest propagation velocity v corresponds to the highest operating ambient temperature.

To simplify the description below, highest propagation velocity vh denotes a propagation velocity at the lowest operating ambient temperature and lowest propagation velocity vl denotes a propagation velocity at the highest operating ambient temperature. Highest propagation velocity vh and lowest propagation velocity vl are previously stored in the memory 63.

Highest propagation velocity vh stored in the memory 63 may be slightly higher than the propagation velocity of an ultrasonic wave propagating through the fuel 210 at the lowest operating ambient temperature. Similarly, lowest propagation velocity vl stored in the memory may be slightly lower than the propagation velocity of an ultrasonic wave propagating through the fuel 210 at the highest operating ambient temperature.

Initially, the arithmetic circuit 61 defines the lower limit and the upper limit for the reference detection period with reference distance L1, highest propagation velocity vh, and lowest propagation velocity v. The lower limit for the reference detection period is formulated as 2L1/vh. The upper limit for the reference detection period is formulated as 2L1/vl.

The arithmetic circuit 61 detects the rising edge of a comparison signal that is input during the reference detection period. The arithmetic circuit 61 computes a time difference between the detected rising edge and a rising edge first detected during the period before the reference detection period. The time difference is assumed to be reference time t01. The arithmetic circuit 61 stores the computed reference time t01 in the memory 63. The timing to raise the rising edge first detected during the period before the reference detection period is comparable to an output timing.

Noise may cause multiple rising edges to be detected during the reference detection period. In this case, the arithmetic circuit 61 selects a rising edge detected in the shortest time during the reference detection period and assumes that rising edge to be the rising edge based on the reference wave.

The arithmetic circuit 61 computes propagation velocity v of an ultrasonic wave based on reference time t01 and reference distance L1 computed above. Propagation velocity v is formulated as v=2L1/t01. The arithmetic circuit 61 stores the computed propagation velocity v in the memory 63.

When the reference detection period is set again, the memory 63 stores reference time t01 that is computed during the process to set the previous reference detection period. The memory 63 in advance stores the correlation between propagation velocity v (fuel temperature) and waveform length Lw1 of the reference wave.

The "waveform length" does not denote a wavelength resulting from dividing the propagation velocity of an ultrasonic wave by the frequency. The waveform length applies to the length of the detection signal illustrated in FIG. 4, for example. The waveform length represents a length beyond the reference value such as a detection signal set to 0 V lower than the threshold value.

From the correlation stored in the memory 63, the arithmetic circuit 61 reads waveform length Lw1 of the reference wave corresponding to propagation velocity v that is computed during the process to set the previous reference detection period. The arithmetic circuit 61 updates the reference detection period based on waveform length Lw1 of the read reference wave and reference time t01 stored in the memory 63. This properly shortens the reference detection period.

The lower limit of the updated reference detection period is formulated as t01−Lw1/2. The upper limit of the same is formulated as t01+Lw1/2. The center value of the updated reference detection period is set to reference time t01 stored in the memory 63. The width of the reference detection period is equal to waveform length Lw1 of the reference wave.

A detection signal based on the reference wave exceeds the threshold value before the detection signal reaches the peak value. Therefore, the center value of the reference detection period may be slightly later than reference time t01 stored in the memory 63. The width of the reference detection period may be set to a value resulting from multiplying Lw1 by a coefficient equal to 1 or greater. The memory 63 may store waveform length Lw1 of the reference wave as a fixed value.

Propagation Path Detection Period

Propagation path time t02 elapses after the ultrasonic sensor 10 outputs an ultrasonic wave until the liquid level wave reflecting off the liquid level 210a returns to the ultrasonic sensor 10. Propagation path time t02 depends on propagation path length L2 and propagation velocity v of the ultrasonic wave.

When propagation velocity v is constant, the shortest propagation path time t02 corresponds to the shortest propagation path length L2. The longest propagation path time t02 corresponds to the longest propagation path length L2. It is expected that a rising edge based on the liquid level wave is detected at the timing between the shortest propagation path time t02 and the longest propagation path time t02. However, a rising edge may be detected during a period except the time between the shortest propagation path time t02 and the longest propagation path time t02. Then, it is supposed that the rising edge does not correspond to a signal based on the liquid level wave.

Propagation path length L2 is shortest when the fuel 210 scarcely remains in the fuel tank 200. Propagation path length L2 is longest when the fuel 210 is filled up in the fuel tank 200. To simplify the description below, shortest propagation path length Ll denotes a propagation path length when the fuel 210 scarcely remains. Longest propagation path length Lh denotes a propagation path length when the fuel 210 is filled up. The memory 63 stores shortest propagation path length Ll and longest propagation path length Lh.

Shortest propagation path length Ll stored in the memory 63 may be slightly shorter than the propagation path length when the fuel 210 scarcely remains in the fuel tank 200. Similarly, longest propagation path length Lh stored in the memory 63 may be slightly longer than the propagation path length when the fuel 210 filled up in the fuel tank 200.

Initially, the arithmetic circuit 61 defines the lower limit and the upper limit for the propagation path detection period based on propagation velocity v, shortest propagation path length Ll, and longest propagation path length Lh stored in the memory 63. The lower limit for the propagation path detection period is formulated as 2Ll/v. The upper limit for the propagation path detection period is formulated as 2Lh/v. Propagation velocity v stored in the memory 63 is equal to propagation velocity v that is computed during the process to set the reference detection period.

The arithmetic circuit 61 detects the rising edge of a comparison signal that is input during the propagation path detection period. The arithmetic circuit 61 computes a time difference between the detected rising edge and a rising edge first detected during the period before the reference detection period. The time difference is assumed to be propagation path time t02. The arithmetic circuit 61 stores the computed propagation path time t02 in the memory 63.

Noise may cause a plurality of rising edges to be detected during the propagation path detection period. In this case, the arithmetic circuit 61 selects a rising edge detected in the shortest time during the propagation path detection period and assumes that rising edge to be the rising edge based on the liquid level wave. The timing to raise the rising edge based on the liquid level wave is comparable to a liquid level timing.

The arithmetic circuit 61 computes propagation path length L2 based on propagation path time t02 and propagation velocity v computed above. Propagation path length L2 is formulated as L2=v×t02/2. The arithmetic circuit 61 stores the computed propagation path length L2 in the memory 63.

When the propagation path detection period is set again, the memory 63 stores propagation path time t02 that is computed during the process to set the previous propagation path detection period. The memory 63 in advance stores the correlation between propagation velocity v (fuel temperature) and waveform length Lw2 of the liquid level wave.

From the correlation stored in the memory 63, the arithmetic circuit 61 reads waveform length Lw2 of the liquid level wave corresponding to propagation velocity v that is computed during the process to set the reference detection period. The arithmetic circuit 61 updates the propagation path detection period based on the read waveform length Lw2 of the liquid level wave and propagation path time t02 stored in the memory 63. This appropriately shortens the propagation path detection period.

The lower limit of the updated propagation path detection period is formulated as t02−Lw2/2. The upper limit of the same is formulated as t02+Lw2/2. The center value of the updated propagation path detection period is set to propagation path time t02 stored in the memory 63. The width of the propagation path detection period is equal to waveform length Lw2 of the liquid level wave.

A detection signal based on the liquid level wave exceeds the threshold value before the detection signal reaches the peak value. Therefore, the center value of the propagation path detection period may be slightly later than propagation path time t02 stored in the memory 63. The width of the propagation path detection period may be set to a value resulting from multiplying Lw2 by a coefficient equal to 1 or greater. The memory 63 may store waveform length Lw2 of the liquid level wave as a fixed value. The memory 63 may store length Lw representing waveform lengths of the reference wave and the liquid level wave so that the waveform lengths are assumed to be the same. The memory 63 may store the waveform length of the ultrasonic wave reflecting off the propagation path as a fixed value.

Figure 7:
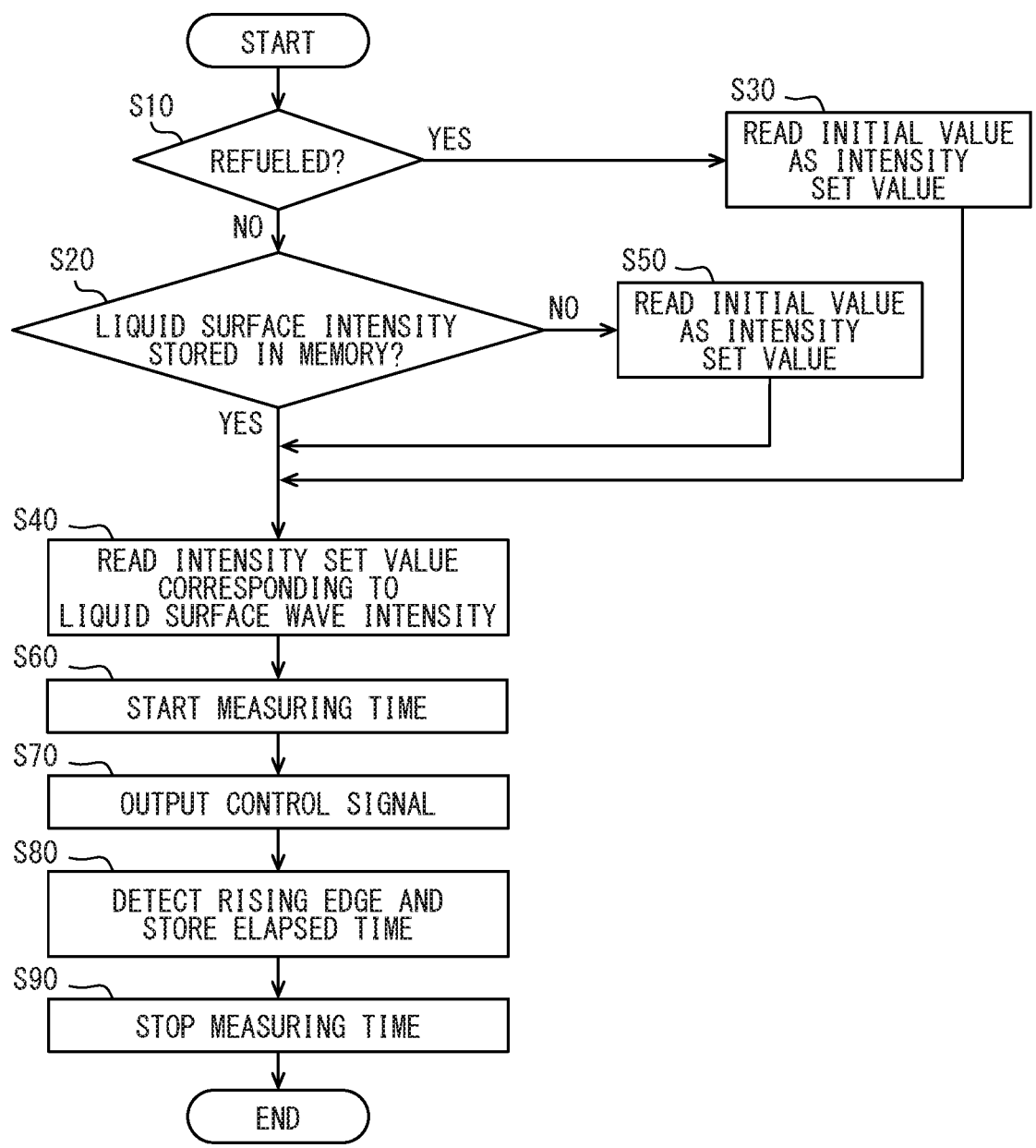
FIG. 7 is a flowchart illustrating an elapsed time detection process.
Figure 8:
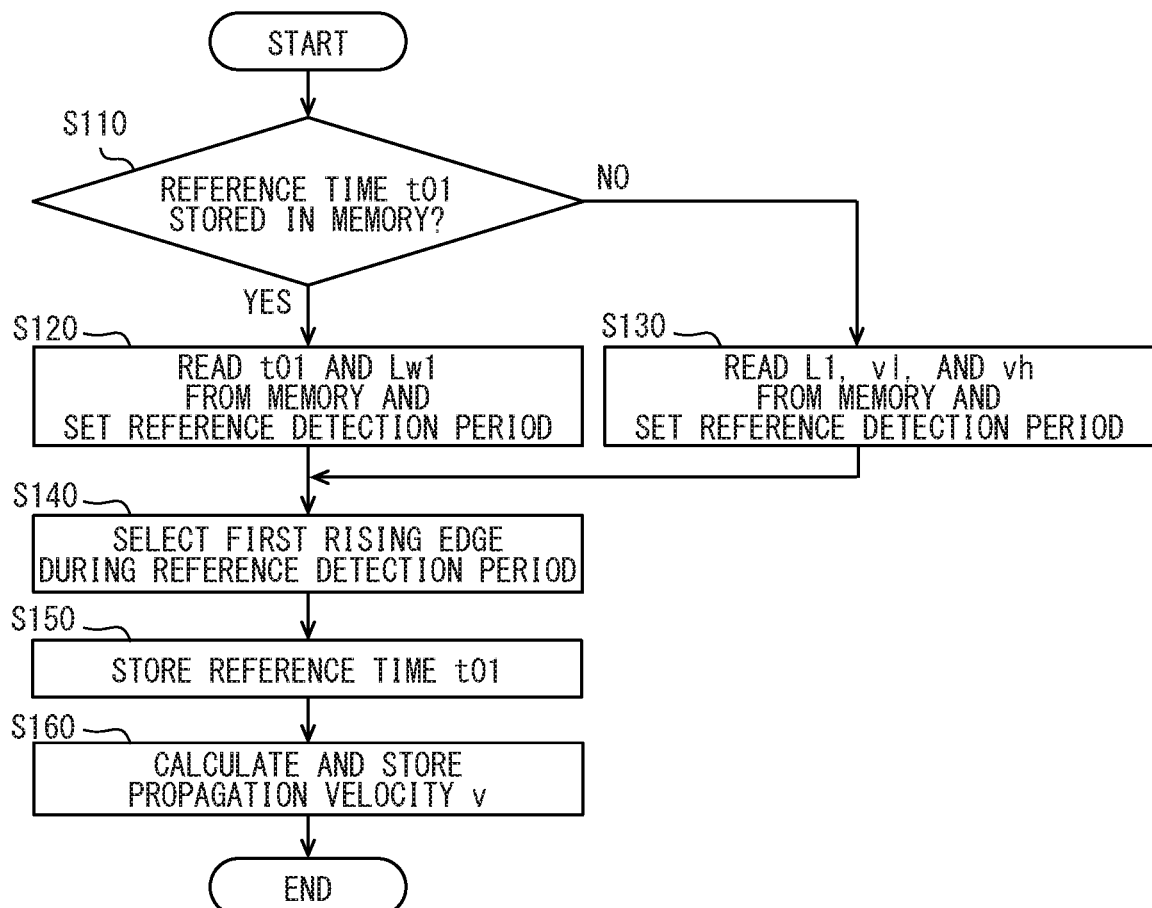
FIG. 8 is a flowchart illustrating a propagation velocity detection process.
Figure 9:
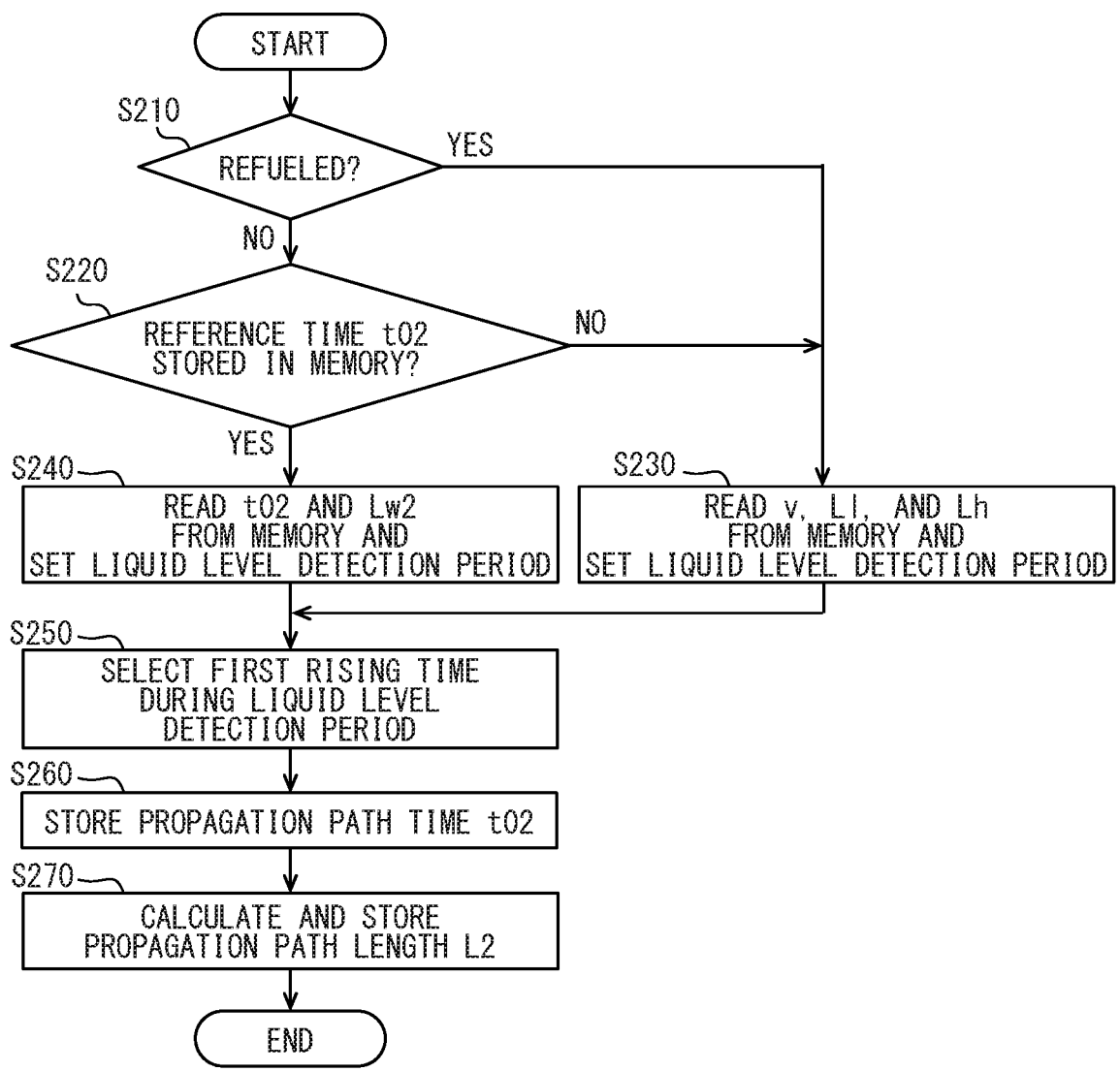
FIG. 9 is a flowchart illustrating a propagation path detection process.

With reference to FIGS. 7 through 9, the description below explains the elapsed-time detection process, the propagation velocity detection process, and the propagation path detection process of the arithmetic circuit 61.

Elapsed-Time Detection Process

FIG. 7 concisely illustrates the elapsed-time detection process. As illustrated in FIG. 3, the vehicle includes a refueling sensor 300 to determine whether the vehicle is refueled. Specifically, the refueling sensor 300 detects opening and closing of the supply port.

When an event task occurs periodically or accidentally, the arithmetic circuit 61 starts executing step S10 of FIG. 7. In step S10, the arithmetic circuit 61 acquires an output from the refueling sensor 300. Based on this, the arithmetic circuit 61 determines whether or not the opening and closing of the fuel supply port has occurred.

When the fuel supply port remains closed, the arithmetic circuit 61 determines that the fuel 210 has not been refueled, and proceeds to step 20. When the fuel supply port changes from the closed state to the open state, the arithmetic circuit 61 determines that the fuel tank 200 has been refueled with the fuel 210 and proceeds to step S30.

In step S20, the arithmetic circuit 61 determines whether the liquid surface wave intensity is stored in the memory 63. When the liquid surface wave intensity is stored in the memory 63, the arithmetic operation circuit 61 proceeds to step S40. When the liquid surface wave intensity is not stored in the memory 63, the arithmetic operation circuit 61 proceeds to step S50.

In step S40, the arithmetic circuit 61 reads the intensity set value of the control signal, which corresponds to the liquid surface wave intensity, from the correlation stored in the memory 63. The arithmetic circuit 61 then proceeds to step S60.

When the process proceeds to step S30 or step S50, the arithmetic circuit 61 reads the initial value stored in advance in the memory 63. The arithmetic circuit 61 then proceeds to step S60.

When the arithmetic circuit 61 executes the elapsed time detection process for the first time, the liquid surface wave intensity is not stored in the memory 63. Therefore, when executing the elapsed time detection process for the first time, the arithmetic circuit 61 executes step S50 instead of step S40. The arithmetic circuit 61 executes step S40 in the subsequent elapsed time detection process. Thus, the intensity of the control signal is updated to a value according to the liquid surface wave intensity.

In step S60, the arithmetic circuit 61 starts measuring the time by using the timer 62.

When the processing proceeds to step S70, the arithmetic circuit 61 outputs a control signal according to the intensity set value read from the memory 63 to the transmission circuit 40. The receiver circuit 50 is then supplied with a drive signal and a reception signal. The arithmetic circuit 61 is supplied with a comparison signal based on these two types of signals.

In step S80, the arithmetic circuit 61 detects the rising edge of the input comparison signal. The arithmetic circuit 61 computes a time difference between the first detected rising edge and a rising edge to be detected later. The time difference is assumed to be an elapsed time until an ultrasonic wave output from the ultrasonic sensor 10 returns to the ultrasonic sensor 10. The arithmetic circuit 61 stores the elapsed time in the memory 63. The arithmetic circuit 61 also computes the elapsed time between the rising edge and the falling edge and stores it in the memory 63.

In step S90, the arithmetic circuit 61 stops measuring the time by using the timer 62. The timing to stop measuring the time is set to be later than the time when the liquid level wave is expected to return to the ultrasonic sensor 10 under the condition that propagation velocity v of an ultrasonic wave is lowest at the operating ambient temperature of the ultrasonic element 11 and the fuel 210 is filled up in the fuel tank 200. The elapsed-time detection process is performed as above.

Propagation Velocity Detection Process

FIG. 8 concisely illustrates the propagation velocity detection process. The arithmetic circuit 61 starts performing step S110 of FIG. 8 after terminating the elapsed-time detection process.

In step S110, the arithmetic circuit 61 determines whether the memory 63 stores reference time t01. If the memory 63 stores reference time t01, the arithmetic circuit 61 proceeds to step S120. If the memory 63 does not store reference time t01, the arithmetic circuit 61 proceeds to step S130.

In step S120, the arithmetic circuit 61 reads reference time t01 and waveform length Lw1 of the reference wave stored in the memory 63. The arithmetic circuit 61 computes lower limit t01−Lw1/2 and upper limit t01+Lw1/2 of the reference detection period. The arithmetic circuit 61 then proceeds to step S140.

In step S130, the arithmetic circuit 61 reads reference distance L1, lowest propagation velocity vl, and highest propagation velocity vh stored in the memory 63. The arithmetic circuit 61 computes lower limit 2L1/vh and upper limit 2L1/v1 of the reference detection period. The arithmetic circuit 61 then proceeds to step S140.

Reference time t01 is not stored in the memory 63 when the arithmetic circuit 61 performs the propagation velocity detection process for the first time. The arithmetic circuit 61 performs step S130 instead of step S120 when performing the propagation velocity detection process for the first time. The arithmetic circuit 61 performs step S120 during the propagation velocity detection process to follow. Then, the reference detection period is updated. The reference detection period is shortened.

In step S140, the arithmetic circuit 61 selects a rising edge of the comparison signal input during the reference detection period. The arithmetic circuit 61 selects a rising edge closest to the lower limit of the reference detection period when the reference detection period includes a plurality of rising edges. The arithmetic circuit 61 then proceeds to step S150.

In step S150, the arithmetic circuit 61 causes the memory 63 to store the elapsed time corresponding to the rising edge selected in step S140 and assumes the elapsed time to be reference time t01. This elapsed time is already computed in step S80 of the elapsed-time detection process. The arithmetic circuit 61 then proceeds to step S160.

In step S160, the arithmetic circuit 61 reads the elapsed time (reference time t01) selected in step S150 and reference distance L1 from the memory 63. The arithmetic circuit 61 computes propagation velocity v=2L1/t01 of the ultrasonic wave. The arithmetic circuit 61 stores propagation velocity v in the memory 63. The propagation velocity detection process is performed as above.

Propagation Path Detection Process

FIG. 9 concisely illustrates the propagation path detection process. The arithmetic circuit 61 starts performing step S210 of FIG. 9 after terminating the propagation velocity detection process.

In step S210, the arithmetic circuit 61 acquires an output from the refueling sensor 300. Based on the output, the arithmetic circuit 61 determines whether the fuel 210 is filled in the fuel tank 200. If no fuel is filled, the arithmetic circuit 61 proceeds to step S220. If the fuel is filled, the arithmetic circuit 61 proceeds to step S230.

In step S220, the arithmetic circuit 61 determines whether the memory 63 stores propagation path time t02. If the memory 63 stores propagation path time t02, the arithmetic circuit 61 proceeds to step S240. If the memory 63 does not store propagation path time t02, the arithmetic circuit 61 proceeds to step S230.

In step S240, the arithmetic circuit 61 reads propagation path time t02 and waveform length Lw2 of the liquid level wave stored in the memory 63. The arithmetic circuit 61 computes lower limit t02−Lw2/2 and upper limit t02+Lw2/2 for the propagation path detection period. The arithmetic circuit 61 then proceeds to step S250.

In step S230, the arithmetic circuit 61 reads propagation velocity v, shortest propagation path length Ll, and longest propagation path length Lh stored in the memory 63. The arithmetic circuit 61 computes lower limit 2Ll/v and upper limit 2Lh/v for the propagation path detection period. The arithmetic circuit 61 then proceeds to step S250.

Propagation path time t02 is not stored in the memory 63 when the arithmetic circuit 61 performs the propagation path detection process for the first time. The arithmetic circuit 61 performs step S230 instead of step S240 when performing the propagation path detection process for the first time. The arithmetic circuit 61 performs step S240 during the propagation path detection process to follow. Then, the propagation path detection period is updated. The propagation path detection period is shortened.

In step S250, the arithmetic circuit 61 selects a rising edge of the comparison signal input during the propagation path detection period. The arithmetic circuit 61 selects a rising edge closest to the lower limit of the propagation path detection period when the propagation path detection period includes a plurality of rising edges. The arithmetic circuit 61 then proceeds to step S260.

In step S260, the arithmetic circuit 61 causes the memory 63 to store the elapsed time corresponding to the rising edge selected in step S250 and assumes the elapsed time to be propagation path time t02. The arithmetic circuit 61 also stores, as the liquid surface wave intensity, the elapsed time between the rising edge selected in step S250 and the falling edge detected subsequently in the memory 63. This elapsed time is already computed in step S80 of the elapsed-time detection process. The arithmetic circuit 61 then proceeds to step S270.

In step S270, the arithmetic circuit 61 reads the elapsed time (propagation path time t02) selected in step S250 and propagation velocity v from the memory 63. The arithmetic circuit 61 computes propagation path length L2=v×t02/2. The arithmetic circuit 61 stores propagation path length L2 in the memory 63. The propagation path detection process is performed as above.

When the above-described processes detect propagation path length L2, the arithmetic circuit 61 computes the liquid level 210*a* in the z-direction based on propagation path length L2 and reference distance L1, for example. The arithmetic circuit 61 outputs data including the computed liquid level to a liquid level display device of the vehicle, for example.

Operation and Effect

The description below explains the operation and effect of the ultrasonic distance measuring device 100.

The memory 63 stores the correlation between the intensity set value of the control signal and the liquid surface wave intensity. The lower the liquid surface wave intensity, the larger the intensity set value. The higher the liquid surface wave intensity, the smaller the intensity set value.

The arithmetic circuit 61 outputs the control signal of the intensity set value corresponding to the liquid surface wave intensity stored in the memory 63 to the transmission circuit 40. As a result, the drive signal corresponding to the liquid surface wave intensity is output from the transmission circuit 40 to the ultrasonic element 11. That is, the drive signal corresponding to the propagation path length L2 is output from the transmission circuit 40 to the ultrasonic element 11.

Therefore, the longer the propagation path length L2, the longer the vibration time of the ultrasonic element 11. The ultrasonic element 11 outputs ultrasonic wave with high intensity. As a result, decrease in the detection accuracy of the propagation path length L2 is suppressed.

In addition, the voltage applied to the ultrasonic element 11 decreases as the propagation path length L2 decreases. As described above, one end of the lead 14 is connected to the electrode formed by printing on the entirety of the contact surface 11*a* and the back surface 11*b* of the ultrasonic element 11 by soldering or pressure contact. When the voltage applied to the ultrasonic element 11 is reduced, occurrence of electrolytic corrosion on the electrodes of the ultrasonic element 11 is suppressed. This suppresses occurrence of electrical connection failure between the electrode of the ultrasonic element 11 and the lead 14. Thus, reduction in the reliability of the electrical connection between the ultrasonic element 11 and the lead 14 is suppressed.

There have been described the preferred embodiments of the present disclosure. However, the disclosure is not limited to the above-mentioned embodiments but may be otherwise variously modified within the spirit and scope of the disclosure.

First Modification

The present embodiment has described that the ultrasonic distance measuring device 100 detects positions of the liquid level 210a of the fuel 210 in the fuel tank 200. However, a detected fluid for the ultrasonic distance measuring device 100 is not limited to the fuel 210 such as gasoline. Detected fluids may include washer solution, cooling fluid, brake fluid, and AT fluid, for example.

Second Modification

In the present embodiment, an example has been shown in which the arithmetic circuit 61 reads the same initial value from the memory 63 in each of step S30 and step S50 of the elapsed time detection process. However, the values read from the memory 63 by the arithmetic circuit 61 in step S30 and step S50 may be different.

Other Modifications

The present embodiment has described the example where the arithmetic circuit 61 sets the reference detection period and the propagation path detection period after computing the elapsed time. However, the arithmetic circuit 61 may compute the elapsed time after setting the reference detection period and the propagation path detection period.

As illustrated in FIG. 8, the present embodiment has described the example of updating the reference detection period through the use of reference time t01 stored in the memory 63, if any. However, the reference detection period may be permanently set based on reference distance L1, highest propagation velocity vh, and lowest propagation velocity vl without updating the reference detection period.

As illustrated in FIG. 9, the present embodiment has described the example of updating the liquid level detection period through the use of propagation path time t02 stored in the memory 63, if any. However, the liquid level detection period may be set based on propagation velocity v, shortest propagation path length Ll, and longest propagation path length Lh without updating the liquid level detection period.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An ultrasonic distance measuring device to measure a length of an ultrasonic wave propagation path between a liquid level of a detected fluid reserved in a tank and an ultrasonic element, the ultrasonic distance measuring device comprising:
    the ultrasonic element configured to generate an ultrasonic wave and to convert an input ultrasonic wave into an electric signal;
    a transmission circuit configured to output a drive signal that causes the ultrasonic element to generate an ultrasonic wave;
    a connection portion that connects the ultrasonic element to the transmission circuit;
    a comparator circuit configured to
        output a first detection signal when the electric signal converted by the ultrasonic element becomes larger than a threshold value and
        output a second detection signal when the electric signal converted by the ultrasonic element becomes smaller than the threshold value;
    an arithmetic circuit configured to compute a length of the propagation path based on a time difference between an output timing, at which the ultrasonic element outputs an ultrasonic wave, and a liquid level timing, at which the comparator circuit outputs the first detection signal based on an ultrasonic wave reflecting off the liquid level, and based on a propagation speed of the ultrasonic wave; and
    a storage unit configured to store a time difference between the first detection signal and the second detection signal of an ultrasonic wave reflecting off the liquid surface, wherein
    the transmission circuit is configured to increase the drive signal, as the time difference, which is between the first detection signal and the second detection signal of an ultrasonic wave reflecting off the liquid level and stored in the storage unit, decreases.

2. The ultrasonic distance measuring device according to claim 1, further comprising:
    a reference pipe extending at a predetermined length in a lateral direction that is orthogonal to a height direction along which the ultrasonic element and the liquid surface are placed; and
    a transmission pipe including a detection pipe that extends in the height direction from a distal end of the reference pipe toward the liquid surface such that a cavity of the reference pipe and a cavity of the transmission pipe communicate with each other, wherein
    the ultrasonic element is configured to generate an ultrasonic wave in the cavity of the reference pipe toward the distal end of the reference pipe,
    the storage unit is configured to store a predetermined length of the reference pipe,
    the arithmetic circuit is configured to
        compute the distance between the ultrasonic element and the liquid surface and further to
        compute a propagation velocity of an ultrasonic wave propagating through the propagation path based on a time difference between the output timing, at which the ultrasonic element outputs an ultrasonic wave, and a reference timing, at which the comparator circuit outputs the first detection signal based on an ultrasonic wave reflecting off the distal end of the reference pipe and the predetermined length of the reference pipe stored in the storage unit.

3. The ultrasonic distance measuring device according to claim 1, wherein
the tank is provided to a vehicle, and
the detected fluid is fuel.

4. The ultrasonic distance measuring device according to claim 1, wherein
the transmission circuit is configured to output the drive signal, which corresponds to a case where the length of the propagation path is the longest, when the ignition switch of the vehicle is turned on from off or when opening or closing of the fuel port of the vehicle is detected.

5. The ultrasonic distance measuring device according to claim 1, wherein
the ultrasonic distance measuring device is provided in the detected fluid reserved in the tank.

6. The ultrasonic distance measuring device according to claim 1, wherein
the transmission circuit is configured to increase the drive signal, as the time difference decreases due to attenuation of the ultrasonic wave.

7. The ultrasonic distance measuring device according to claim 1, wherein
the storage unit is configured to store a control signal having an intensity corresponding to the time difference, and
the arithmetic circuit is configured to output, as the control signal, a number of pulse signals, which correspond to the time difference, to the transmission circuit, such that the number of the pulse signals increases as the time difference decreases.

* * * * *